United States Patent

[11] 3,586,439

| [72] | Inventors | Richard W. Treharne<br>Xenia;<br>Charlton K. McKibben, Dayton, both of, Ohio |
|------|-----------|---|
| [21] | Appl. No. | 744,992 |
| [22] | Filed     | July 15, 1968 |
| [45] | Patented  | June 22, 1971 |
| [73] | Assignee  | Kettering Scientific Research, Inc.<br>Continuation-in-part of application Ser. No. 604,976, Dec. 27, 1966, now Patent No. 3,398,281. |

[54] DIRECT READING PYROMETER EMPLOYING PYROELECTRIC CRYSTAL DETECTOR
8 Claims, 4 Drawing Figs.

| [52] | U.S. Cl.......... | 356/43, 350/269, 250/83, 73/355 |
|------|-------------------|---|
| [51] | Int. Cl.............. | G01j 5/48 |
| [50] | Field of Search.... | 356/43, 46, 47, 49; 350/269; 250/83; 73/355 |

[56] References Cited
UNITED STATES PATENTS

| 3,398,281 | 8/1968 | Treharne et al. | 73/355 X |
| 3,444,739 | 5/1969 | Treharne | 73/355 |
| 3,453,432 | 7/1969 | McHenry | 73/355 X |

*Primary Examiner*—Ronald L. Wibert
*Assistant Examiner*—Paul K. Godwin
*Attorney*—Marechal, Biebel, French and Bugg ABSTRACT: A lead zirconium titanate crystal possessing pyroelectric characteristics is employed in a direct reading pyrometer for measuring directly the temperature of an object, principally by the infrared radiation emitted therefrom. The pyroelectric crystal is provided on two opposing surfaces with an electrically conductive material and absorbing coating is placed on the surface exposed to the incident radiation to convert that radiation into heat thereby polarizing the pyroelectric crystal and developing an electrical voltage related to the temperature of the object. A low inertia oscillating vane interrupts the incident radiation to provide a continuous voltage output from the crystal, and filtering and gating circuits are included in the electronic readout circuit to minimize piezoelectric voltages which may be generated by mechanical forces transmitted to the crystal.

PATENTED JUN22 1971 3,586,439
SHEET 1 OF 2
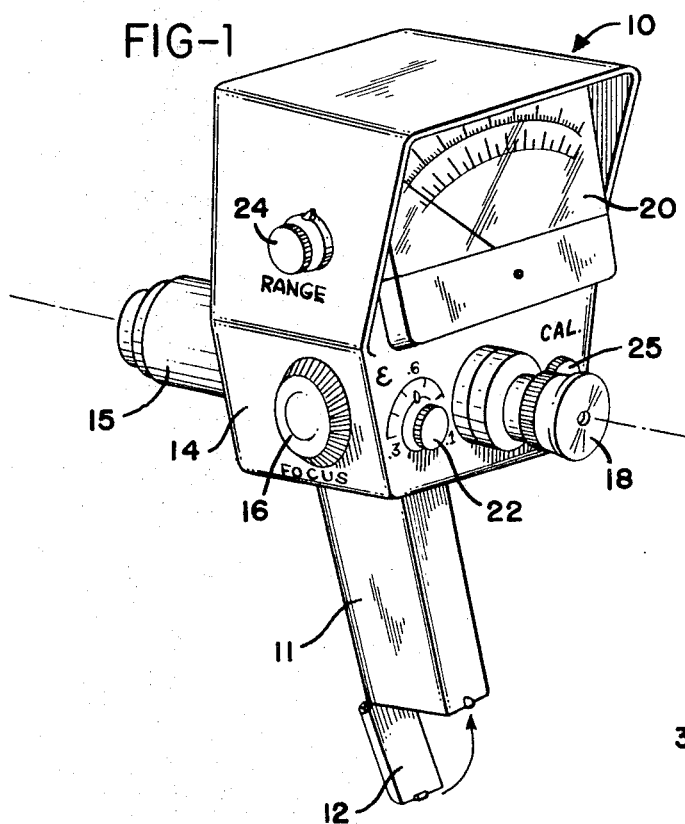
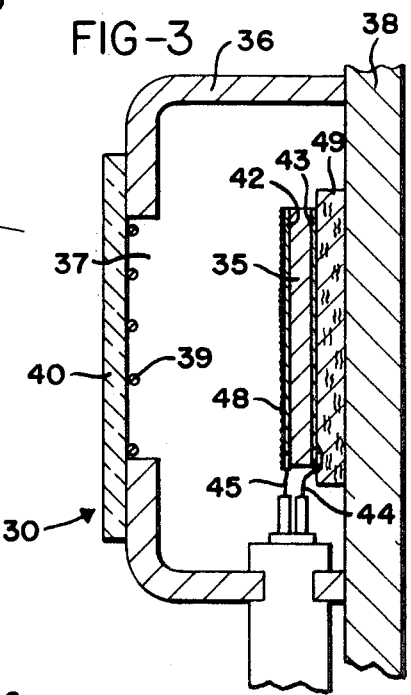
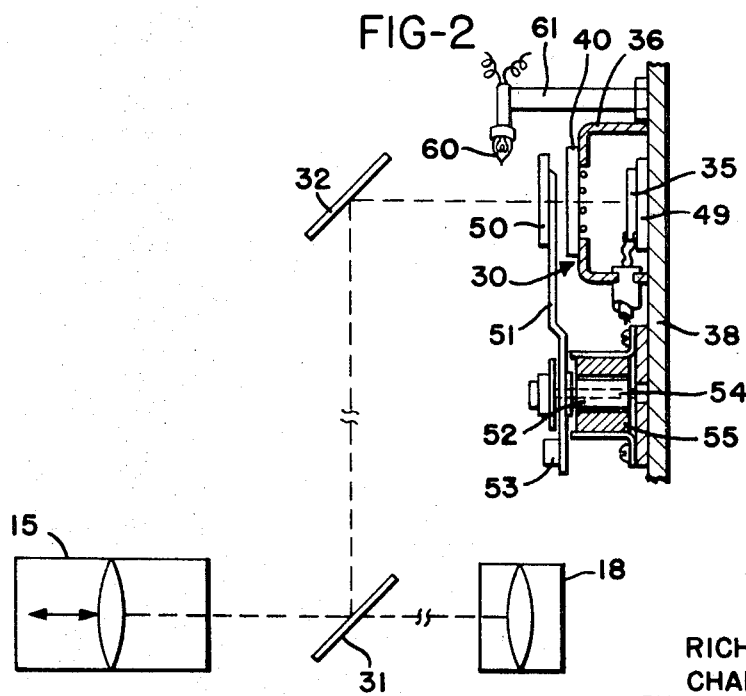
INVENTORS
RICHARD W. TREHARNE &
CHARLTON K. McKIBBEN
BY
Marechal, Biebel, French & Bugg
ATTORNEYS

DIRECT READING PYROMETER EMPLOYING PYROELECTRIC CRYSTAL DETECTOR

RELATED APPLICATIONS

This application is a continuation-in-part of application Ser. No. 604,976, filed Dec. 27, 1966, now U.S. Pat. No. 3,398,281. Reference is also made to copending application Ser. No. 515,601, filed Dec. 22, 1965, now U.S. Pat. No. 3,444,739, assigned to the same assignee as the present invention.

BRIEF SUMMARY OF THE INVENTION

This invention relates to a pyrometer for measuring the temperature of or the incident radiant power from an object. of the present invention utilizes a crystal exhibiting pyroelectric characteristics, that is, the crystal is temperature dependent and when the temperature changes, electrical polarization of the crystal occurs to produce a voltage. This electric polarization will persist until the electric charge is neutralized either through internal or external electrical charge dissipation. The pyroelectric effect is somewhat similar to the piezoelectric effect of certain crystals in which polarization can be induced by pressure changes. It has been found that the crystals which exhibit the pyroelectric characteristics also exhibit piezoelectric characteristics, but the converse is not necessarily true. Therefore, certain types of anistropic materials are employed as pyroelectric devices and such crystals have a structure which not only lacks a center of symmetry but which also have a single, unique polar axis.

In the present invention, a pyroelectric crystal formed preferably of lead zirconium titanate is placed in a housing to isolate it from mechanical forces sand to reduce the piezoelectrical voltages which would be produced if these mechanical forces were transmitted to the crystal. An absorbing coating preferably is placed on the radiation receiving portion of the crystal to convert the radiation to heat, and an oscillating vane is disposed between the crystal and the source of radiant energy to interrupt periodically the radiation received by the crystal and thus provides a continuously varying change in temperature at the crystal to permit a continuously varying voltage output therefrom. The range of voltage from the maximum to the minimum is therefore a measure of the intensity of the incident radiation. In addition to the special mechanical mounting of the crystal, piezoelectric voltages are further eliminated by employing filter and gating circuits in the readout circuit of the radiometer which are synchronized with the frequency of oscillation of the moving vane.

The pyrometer of the present invention is provided with a housing to isolate the pyroelectric crystal from ambient electrostatic fields since that crystal is a high impedance device and will pickup voltages induced by such fields. The housing may also contain a calibrating radiant power source which may be used when excluding other forms of radiation from the crystal.

Accordingly, it is an object of this invention to provide a pyrometer capable of measuring extremely small quantities of incident radiation power by using a pyroelectric crystal having an absorbing coating on its radiation receiving portion to convert the radiation to heat and by placing a filter between the crystal and the source of radiation to limit the radiation principally to the infrared range; to provide a pyrometer employing a crystal exhibiting pyroelectric characteristics positioned within an electrostatic shield and so mounted thereto that mechanical forces from said shield are not transmitted to the crystal; to provide a pyrometer employing a crystal exhibiting pyroelectric characteristics having an absorbing coating on its radiation receiving surface and mounted within a housing providing electrostatic and mechanical shielding wherein the radiation is focused by optical means onto the crystal and is interrupted periodically by a low inertia light chopping mechanism causing the crystal to provide a continuously varying voltage output, the magnitude of which is directly related to the temperature of the object being observed.

Other objects and advantages of the invention will be apparent from the following description, the accompanying drawings and the appended claims.

BRIEF DESCRIPTION OF THE DRAWINGS

FIG. 1 is a perspective view of the pyrometer made according to this invention;

FIG. 2 is a cross-sectional view through the heat sensing element, and diagrammatically illustrating a suitable optical layout;

FIG. 3 is an enlarged cross-sectional view of the pyroelectric detector; and

DESCRIPTION OF THE PREFERRED EMBODIMENT

Figure 4:
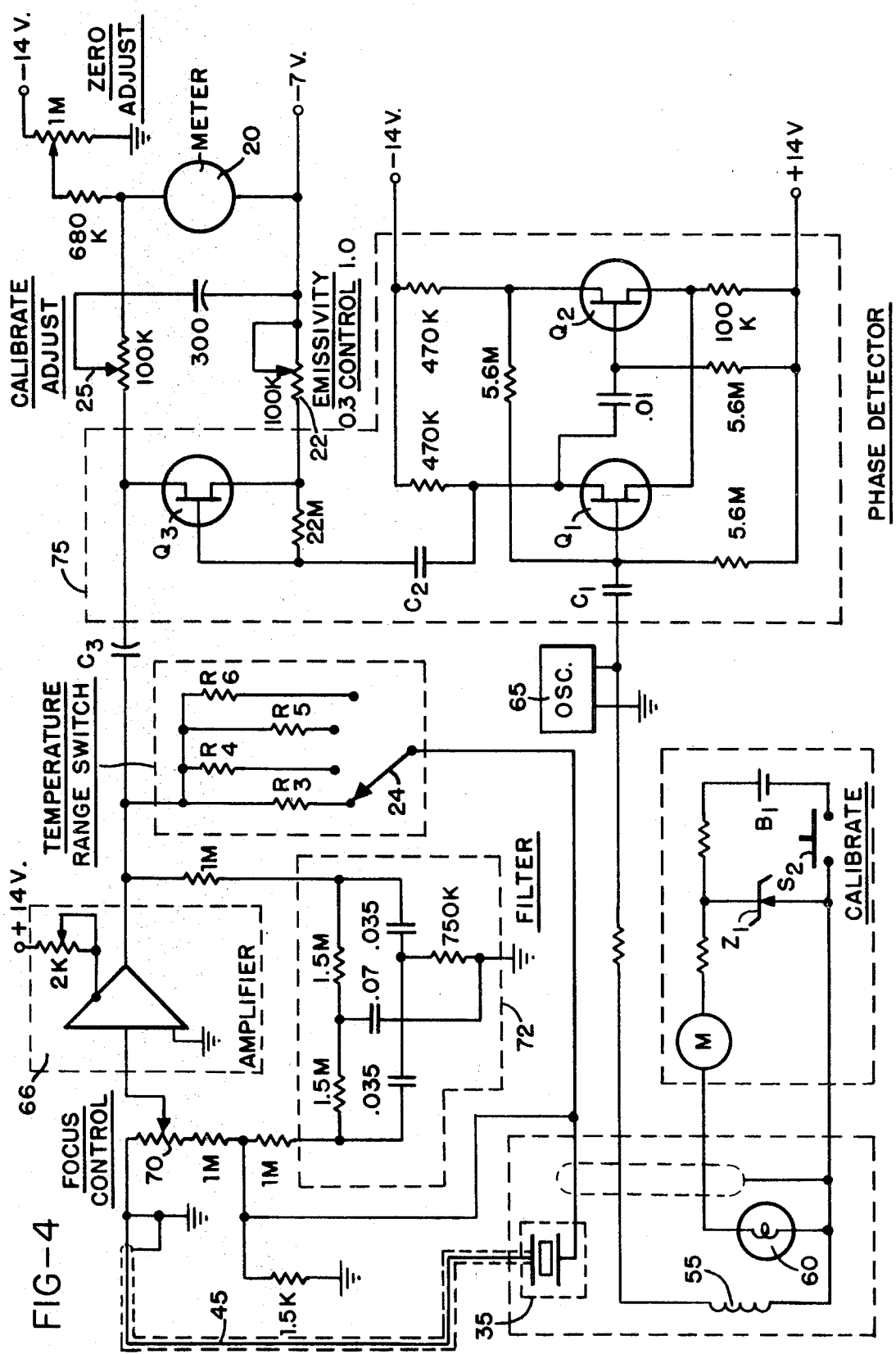
FIG. 4 is an electrical schematic diagram of a readout circuit for the pyrometer constructed according to this invention.

In FIG. 1, the pyrometer 10, which may include a hollow gripping handle 11 and a bottom trapdoor 12 through which batteries may be inserted into the handle 11, includes a body 14 upon which is mounted a forward looking objective lens 15. The lens 15 is adjustable along its optical axis by rotating a focus knob 16 on the left side of the body 14. An eyepiece 18 is provided at the rear panel of the body 14 through which an operator may observe the object being measured directly through the lens 15. The pyrometer further includes a direct reading meter 20 upon which the temperature of the object observed may be read.

The pyrometer may further include an emissivity control 22 by means of which an operator may adjust the instrument for deviations from the emissivity of a standard black body of the object or body being measured. Accordingly, the emissivity control 22 provides means for increasing the effective temperature readings which may be proportionately increased by increasing the sensitivity of the instrument to take into account the fact that the object being observed is not a true black body radiator.

The pyrometer 10 further includes a temperature range switch 24 by means of which the operator may select the desired scale on the instrument meter 20. Also included is a calibration adjustment control knob 25. The pyrometer 10 preferably includes a pyroelectric detector 30 which may be internally constructed according to the teachings of the above mentioned application Ser. No. 604,976.

As shown in FIG. 2, the objective lens 15 is adjustable along its optical axis, such as by rotating the knob 16, and the image therefrom is transmitted by a partially silvered mirror 31 to a full silvered mirror 32 and then directed into the detector 30. A small portion of the light, such as 10 percent, is permitted to pass through the half-silvered mirror 31 to the eyepiece 18. In the preferred embodiment of this invention, the lens 15 should be capable of passing a wide range of wavelengths, particularly in the infrared region. The particular lens used will depend upon the use to which the pyrometer will be put. With some lens materials which also pass light in the visible range, such as "IRTRAN 4" (made by Eastman Kodak) which has a useful transmittance of from 0.5 to 22 microns, the use of an eyepiece 18 which observes the object through the lens 15 would be permitted. With other types of lens material which are substantially if not completely opaque to visible light, such as "IRAN" (Eastoman Kodak) to it would be desirable to provide a parallel optical a parallel optical path for the eyepiece 18 to assist the operator in aiming the pyrometer to direct the image of the object directly onto the detector 30.

The detector 30 includes a pyroelectric crystal detector element 35 mounted within a housing 36 which has an opening 37 aligned to permit the radiation from the lens to pass therethrough and impinge on the pyroelectric crystal 35. The housing 36 is secured to a support member 38, and both the housing and the support member are electrically conductive and provide an electrostatic shield for the crystal 35. A further electrostatic shield includes a plurality of wires 39 electrically connected to the housing 36 and extending across the opening 37 several times. The wire 39 permits radiation freely to pass through the opening while shielding the interior of the housing 36 from external electrostatic fields.

A window or filter 40 may be provided in the opening 37 to insulate the interior of the housing 36 against changes in the ambient environment. This window would normally be of the same material as used in the objective lens 15. The use of this window 40 is optional.

The pyroelectric crystal detector element 35 is shock mounted within the housing 36 and provides a voltage proportional to the change in the temperature of the crystal. The pyroelectric effect of the crystal 35 may be described as a temperature dependent, electric polarization exhibited by certain types of anistropic materials. When a crystal of pyroelectric material is subjected to a temperature change, the crystal will be electrically polarized and this polarization will persist until the change is neutralized, either by current dissipation internally or through an external circuit.

While several types of pyroelectric crystals are available, it has been found that barium titanate or lead zirconium titanate are especially useful with the lead zirconium titanate crystal being preferred. In one embodiment of this invention, a crystal three-eighths inch diameter and 0.010 inch thick is formed from lead zirconium titanate manufactured under the trade designation PZT-5H available from Clevite Corporation of Cleveland, Ohio. The dimensions and type of crystal are selected to provide a compromise among high pyroelectric coefficient at room temperature, mechanical properties facilitating fabrication and time constant characteristics.

The detector 30, shown in detail in FIG. 3, includes a crystal 35, coated on opposite surfaces with electrically conducting coatings 42 and 43. Electrical leads 44 and 45 are attached by electrically conducting epoxy to these coatings for connection to the readout circuit.

The crystal is coated on the surface facing the opening 37 in the housing 36 with a radiation absorbing compound 48 such as carbon black suspension manufactured under the trade names "Parson's optical flat black lacquer, manufactured by Parsons Limited of England or Krylon black enamel No. 1602 manufactured by Krylon, Inc., Norristown, Pennsylvania. It has been found that a black coating of approximately 0.001 inch thickness is adequate to provide good thermal response characteristics.

While the coating 48 used in the preferred embodiment is black, and has an essentially wavelength independent response, other types of coatings may be employed depending on the wavelength response characteristics desired. As pointed out above, the wavelength responsive characteristics of the pyrometer will also depend on the transmission characteristics of the lens 15 and the window 40.

The crystal 35 is mounted on a shock absorbing pad 49 in line with the opening 37 in the housing. The shock absorbing pad may be of cork, rubber, or other similar material to provide a shock mounting for the crystal 35 to minimize the transmission of mechanical forces to the crystal and thus to minimize the piezoelectric voltages produced thereby. The shock absorbing pad 49 is mounted on the support plate 38.

Since the pyroelectric crystal detector produces a voltage in response to a change in temperature, means have been provided to interrupt periodically the radiation directed to the crystal and thereby cause a continuously varying temperature on the absorbing coating of the crystal. A low inertia vane 50 is mounted to move from a first position clear of the path of radiation from the mirror 32 through the opening 37 to the crystal, to a second or intermediate position in the path of the radiation. The vane 50 has an area sufficient to shield the crystal completely from all incoming radiation when in the second or intermediate position. The vane 50 is made of a relatively thin aluminum plate mounted directly on a meter movement needle 51.

A center zero milliameter 52 may be used for moving the vane at regular intervals, typically 3 cycles per second, from the first position through the second position to a third position clear of the radiation path. The meter movement is modified by the addition of a counterweight 53 of a size sufficient to counterbalance the additional weight of the vane 50. In the embodiment shown, the armature 54 of the meter movement is a permanent magnet while the field coil 55 is an electromagnet which may be driven by a low power oscillator to cause the vane to oscillate between its extreme positions. While other types of means for moving the vane 50 periodically in front of the crystal, the particular arrangement described herein is a low inertia type movement which produces little vibration while in operation which could be transmitted to the crystal 35 to induce piezoelectric voltage.

Also contained within the housing 14 is a calibrating light source 60 comprising a tungsten lamp supplied with a constant voltage from a regulated power source, normally at a voltage below the rated voltage of the lamp. The lamp 60 is mounted on an extension 61 from the plate 38 and is so positioned that the radiation from the lamp to the crystal may be interrupted completely by the vane 50 when it is in its second position.

Referring now to FIG. 4 which is an electrical schematic diagram of the pyroelectric detector and the associated readout circuitry, the detector crystal 35 receives radiation from the object being observed. An oscillator 65 supplies the necessary oscillating current to the coil 55 of the meter movement to move the vane into the path of radiation to cause a continuously varying voltage output from the crystal. The output from the crystal on shielded line 45 is applied to an operational amplifier 66, such as Model No. 132, manufactured by Zeltex, through the focus control 70 which may be ganged for simultaneous movement with the focus knob 16. It is especially important to provide compensation for distance when the image of the object being measured does not completely cover the crystal 35. Typically, the focus control will allow temperature measurements of objects from 3 to infinity.

Associated with the amplifier 66 is the temperature range switch 24 which controls the amount of feedback to the operational amplifier. Temperature measurements typically in the range from 25° C. to 3000° C. may be provided. A twin T-filter 72, tuned to the frequency of the oscillations of the vane 50, provides a feedback path for the operational amplifier 66.

The output of the amplifier 66 is fed into a phase detector 75. This detector also receives a signal from the oscillator 65 and functions to gate the amplifier output through the phase detector and into the meter 20 in such a manner that the peak positive and peak negative voltages from the detector are applied to the meter. Thus, both the twin T-filter 70, and the phase detector 72 operate together to limit the output of the detector to those signals which are due to the radiation impinging on the crystal 35, and inherently reject all other signals to render the circuit essentially insensitive to the piezoelectric voltages generated by the crystal as a result of mechanical forces.

The emissivity control 22 in series with the meter 20 provides adjustment of the sensitivity of the instrument for known variations from the emissivity of a black body. For example, the emissivity of iron may be 0.6 and of aluminum 0.8, and the control 22 may be accordingly calibrated so that known variations in emissivity can be directly inserted.

The calibrating lamp 60 is supplied with a regulated voltage upon the closure of switch S1. This switch connects the battery B1 through a resistor to the Zener diode Z1. When calibrating, the range switch is connected to a calibrating resistor in the feedback circuit and calibrating potentiometer 25 is adjusted to obtain a proper reading on the meter 20.

A more complete and detailed explanation of the function of the circuit shown in FIG. 4 may be found in the above mentioned copending application Ser. No. 604,976.

The device described above is therefore useful as a radiometer, with its response characteristics being controlled by the radiation transmission characteristics of the lens 15 and the window 40 and by the absorption characteristics of the coating 48 on the pyroelectric crystal.

While the form of apparatus herein described constitutes a preferred embodiment of the invention, it is to be understood

What I claim is:

1. A pyrometer comprising
   a housing means effective to shield the pyrometer from electrostatic fields, mechanical forces and instantaneous changes in ambient temperature, said housing having an opening in one portion thereof to admit incident radiation from an object, the temperature of which is to be measured;
   a pyroelectric crystal capable of undergoing changes in electrical polarization as a result of changes in the temperature sensed into heat; for producing a voltage indicating the intensity of the incident radiation applied thereto, and an electrically conducting coating on opposite surfaces of said crystal;
   means on the surface of said crystal facing the opening in said housing means for converting the incident radiation into heat;
   means transparent to infrared radiation mounted on said housing to isolate said crystal from instantaneous changes in ambient temperature while permitting radiation at least in the infrared range to pass therethrough;
   means shock mounting said pyroelectric crystal within said housing means to render said crystal substantially insensitive to mechanical forces and to minimize piezoelectric voltages produced thereby;
   a pyroelectric crystal capable of undergoing changes in electrical polarization as a result of changes in the temperature sensed thereby for producing a voltage indicating the intensity of the incident radiation applied thereto, and an electrically conducting coating on opposite surfaces of said crystal;
   means for optically focusing the incident radiation onto said pyroelectric crystal;
   means movable between a first position clear of the path between said crystal and the source of the incident radiation and a second position in the path of the radiation, said movable means having an area sufficient to shield the crystal from the radiation when in said second position;
   means to move said movable means at regular intervals between said first position and said second position and into the path of the radiation to cause periodic changes in the temperature of said crystal thus causing the crystal to produce a voltage, the magnitude of which is an indication of the temperature of the object; and
   a readout circuit connected to said electrically conducting coatings on said pyroelectric crystal and responsive to the variations in voltage produced thereby to provide an output which is a direct function of the temperature of the object being observed.

2. The pyrometer of claim 1 wherein said means for optically focusing the incident radiation onto said crystal includes
   a forward looking objective lens mounted on said housing and being adjustable along its optical axis for focusing;
   an eyepiece mounted on said housing;
   a partially silvered mirror in said housing positioned to direct a small portion of the radiation received from said objective lens to said eyepiece and to direct the remaining radiation onto said crystal.

3. The pyrometer of claim 2 further including
   a movable focusing control mechanically connected to adjust said lens along its optical axis; and
   an electrical control connected to said readout circuit for varying the sensitivity of said circuit in accordance with the position of said lens.

4. The radiometer defined in claim 1 wherein said readout circuit includes a phase detector circuit synchronized with the periodic movement of said movable means interrupting the radiation to said crystal to allow only those signals having a frequency in the range of the frequency of oscillation of said movable means to pass therethrough to render the output of said circuit essentially independent of piezoelectric voltages generated by said crystal due to mechanical forces.

5. The radiometer defined in claim 1 wherein said readout circuit includes a filter circuit having a band pass frequency centered about the frequency of the periodic movements of said movable means interrupting the radiation to said crystal further to permit amplification of only those signals having a frequency in the range of frequencies of oscillations of said movable means to render the output of said circuit independent of piezoelectric voltages generated by said crystal due to mechanical forces.

6. A radiometer defined in claim 1 further including electrostatic shielding means disposed across the opening in said housing means to isolate the pyroelectric crystal contained therein from ambient electrostatic fields.

7. The radiometer defined in claim 1 wherein said pyroelectric crystal is formed from lead zirconium titanate.

8. A pyrometer comprising
   a housing means effective to shield the pyrometer from electrostatic fields, mechanical forces and instantaneous changes in ambient temperature, said housing having an opening in one portion thereof to admit incident radiation from an object, the temperature of which is to be measured;
   a pyroelectric crystal capable of undergoing changes in electrical polarization as a result of changes in the temperature sensed thereby for producing a voltage indicating the intensity of the incident radiation applied thereto, and an electrically conducting coating on opposite surfaces of said crystal;
   means on the surface of said crystal facing the opening in said housing means for converting the incident radiation into heat;
   means transparent to infrared radiation mounted on said housing to isolate said crystal from instantaneous changes in ambient temperature while permitting radiation at least in the infrared range to pass therethrough;
   means shock mounting said pyroelectric crystal within said housing means to render said crystal substantially insensitive to mechanical forces and to minimize piezoelectric voltages produced thereby;
   means for optically focusing the incident radiation onto said pyroelectric crystal including a forward looking objective lens mounted on said housing and being adjustable along its optical axis for focusing an eyepiece mounted on said housing positioned to direct a small portion of the radiation received from said objective lens to said eyepiece and to direct the remaining radiation onto said crystal;
   a movable focusing control mechanically connected to adjust said lens along its optical axis;
   means movable between a first position clear of the path between said crystal and the source of the incident radiation and a second position in the path of the radiation, said movable means having an area sufficient to shield the crystal from the radiation when in said second position;
   means to move said movable means at regular intervals between said first position and said second position and into the path of the radiation to cause periodic changes in the temperature of said crystal thus casing the crystal to produce a voltage, the magnitude of which is an indication of the temperature of the object;
   a readout circuit connected to said electrically conducting coatings on said pyroelectric crystal and responsive to the variations in voltage produced thereby to provide an output which is a direct function of the temperature of the object being observed; and
   an electrical control connected to said readout circuit for varying the sensitivity of said circuit in accordance with the position of said lens, said electrical control being connected for simultaneous movement with said focusing control.

PO-1050
(5/69)

UNITED STATES PATENT OFFICE
CERTIFICATE OF CORRECTION

Patent No. 3,586,439      Dated June 22, 1971

Inventor(s) Richard W. Treharne and Charlton K. McKibben

It is certified that error appears in the above-identified patent and that said Letters Patent are hereby corrected as shown below:

Column 1, line 16, insert -- received -- after "power".
          line 16, delete "of".
          line 17, insert -- The pyrometer of -- (this begins a new paragraph).
          line 34, change "sand" to -- and --.

Column 2, line 62, change "IRAN" to -- IRTRAN 6 --.
          line 62, change "Eastoman" to -- Eastman --.
          line 62, after "Kodak" delete "to" and insert -- which has a useful transmittance of from 1.5 to 31 microns, --.
          line 63, delete "a parallel optical" (first occurrence).

Column 4, line 34, insert -- feet -- after "3".
          line 61, change "S1" to -- S2 --.

Column 5, lines 30-35, delete in their entirety.

Column 6, line 60, change "casing" to -- causing --.

Signed and sealed this 11th day of April 1972.

(SEAL)
Attest:

EDWARD M. FLETCHER, JR.           ROBERT GOTTSCHALK
Attesting Officer           Commissioner of Patents